United States Patent [19]
Karasawa

[11] 3,981,565
[45] Sept. 21, 1976

[54] LIGHT-MODULATING DEVICE

[75] Inventor: Tamotsu Karasawa, Kawasaki, Japan

[73] Assignee: Canon Kabushiki Kaisha, Tokyo, Japan

[22] Filed: Oct. 23, 1973

[21] Appl. No.: 408,266

[30] Foreign Application Priority Data
Oct. 28, 1972 Japan............ 47-123933[U]

[52] U.S. Cl................ 350/266; 178/7.92; 350/314
[51] Int. Cl.²............................. G05D 25/00
[58] Field of Search........... 350/266, 314; 178/7.92

[56] References Cited
UNITED STATES PATENTS

| | | |
|---|---|---|
| 3,669,540 | 6/1972 | Rattman et al................. 350/314 X |
| 3,700,314 | 10/1972 | Busby................................. 350/314 |

*Primary Examiner*—John K. Corbin
*Assistant Examiner*—F. L. Evans
*Attorney, Agent, or Firm*—Toren, McGeady and Stanger

[57] ABSTRACT

A light-modulating device having an extended range of light modulation comprising a mechanical variable diaphragm means and a neutral density filter arranged to optically cover the aperture opening of said diaphragm means, said filter being characterized as including two regions, one of which is a central uniform density region which is centered at the optical axis, while in the other region contiguous to the central region, the density is decreased with radius. In this manner the amount of light is varied in passing through the light-modulating device as a function of the area of the aperture opening and the transmittance of effective area of the filter. A method of producing filters of such characteristics are also disclosed.

4 Claims, 5 Drawing Figures

LIGHT-MODULATING DEVICE

DETAILED EXPLANATION OF THE INVENTION

This invention relates to light-modulating devices and more particularly to a light-modulating device suitable for use as a variable diaphragm device for television cameras, photographic cameras and the like.

With recent development of high sensitive image pickup tubes, the range of luminance of photographable scenes is extended from very bright to very dark, which requires that the objective of the television camera associated with such an image pickup tube be capable of controlling light modulation over a very wide range corresponding to the range of responsiveness of the image pickup tube. However, conventional television objectives have light-modulating devices incorporated therein in the form of a variable diaphragm, most of which are variable in a range of from F 1.4 to F 32, or in a light modulation ratio of 1:1000, while the image pickup tube requires a light modulation ratio as large as at least several tens of times that of the light-modulating device.

In the conventional light modulation practice, a series of neutral density filters of different density are particularly employed for insertion into the light-modulating device according to the need. However the selection and interchanging of the neutral density filter brings forth drawbacks that the performance of the television camera is considerably reduced, and that the structure of the lens barrel is made complicated.

An object of the present invention is to overcome such drawbacks and to provide an objective for television cameras with a light-modulating device therein which comprises, in combination, a variable mechanical diaphragm device such as a variable iris diaphragm device, and a neutral density filter of gradation type (called "optical attenuator") in which the density is decreased with radius arranged in coaxial relation to the optical axis of the objective, and which is capable of light modulation over a wide range in accordance with only the aperture control of the mechanical diaphragm device. The density characteristics of the neutral density filter in accordance with the invention is characterized as including two regions, that is, a central maximum uniform density region which is centered at the optical axis and a surrounding region contiguous to the central region in which the density is linearly decreased with radius.

Another object of the present invention is to provide a method of producing filters of the characteristics described above by utilizing the vignetting around the optical axis in front of or in rear of the focal plane in such a way that a circular solid pattern carried on an original copy is projected by an imaging lens onto a photo-sensitive silver halide emulsion film positioned immediately in front of or in rear of the focal plane, thereby the intensity of incident light is radially varied to provide for two regions corresponding to those of the neutral density filter.

An additional object of the present invention is to provide an alternative method of producing filters of the characteristics described above by utilizing arranged minute dots of which the density is progressively decreased with radius.

The invention will be further described with reference to preferred embodiments shown by way of example only in accompanying drawings wherein.

Figure 1:
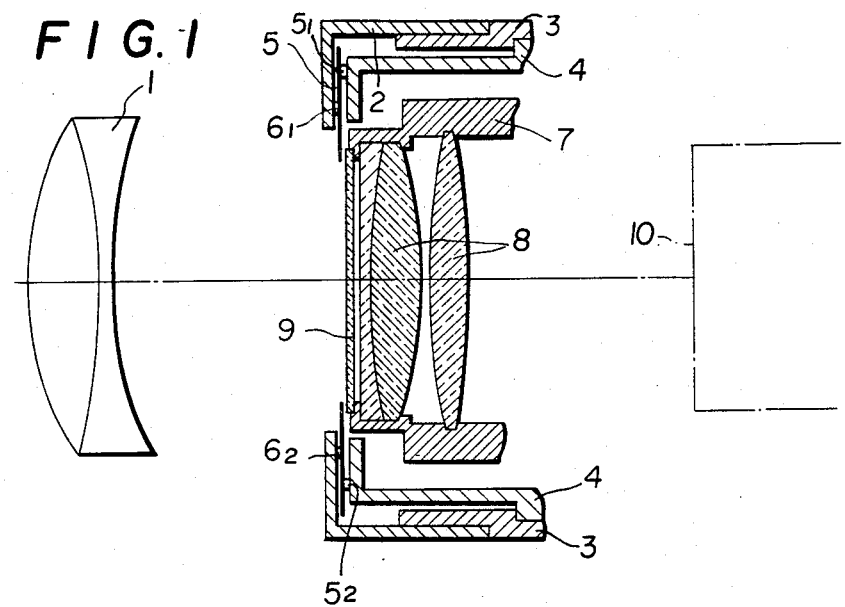
FIG. 1 is a sectional view of a light-modulating device adapted for use in a television camera in accordance with the present invention.
Figure 2:
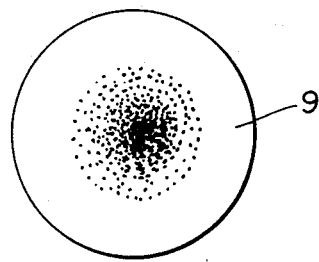
FIG. 2 is a front view of a neutral density filter incorporated in the light-modulating device of FIG. 1.

Referring now to FIG. 1, a television objective arranged in front of an image pickup tube that is indicated at 10 is schematically and fragmentally illustrated as including a compensator lens component 1, other optical components such as the front lens assembly and the variator lens component of the zoom lens system being not shown, an aperture setting ring 2 rotatably mounted on a lens barrel 3, a fixed frame 4 mounted inside the lens barrel 3, diaphragm blades 5, pins $5_1$ and $5_2$ planted on the diaphragm blades, pins $6_1$ and $6_2$ planted on the aperture setting ring and mounted in camming engagement with slots bored in the diaphragm blades, the parts from 2 to $6_2$ constituting a customary aperture-regulating device, a lens holding frame 7, a relay lens 8, a neutral density filter 9 shown in FIG. 2, and a television camera tube 10 with the photoelectric converter surface positioned at the focal plane of the zoom lens system.

Figure 3:
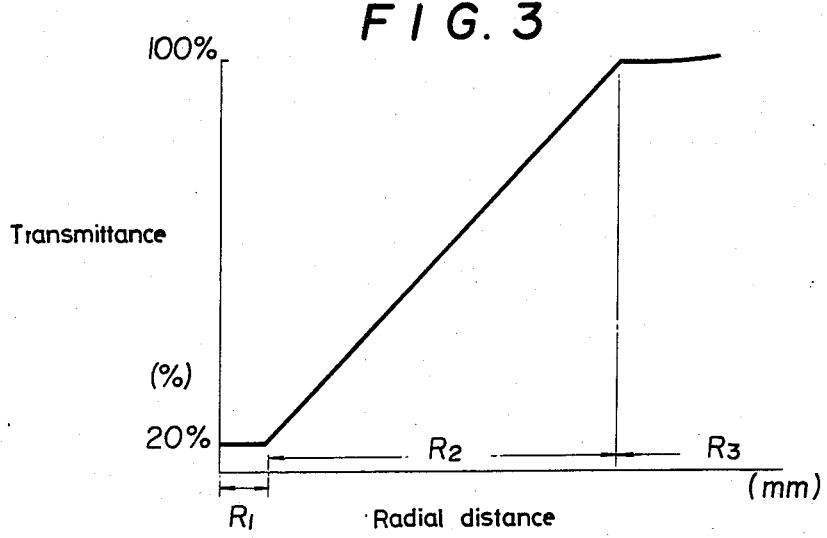
FIG. 3 is a curve illustrating the variation of transmittance of the filter shown in FIG. 2 with radius.

The density characteristics of the filter 9 includes three regions as diagrammatically illustrated in FIG. 3. In the first central region $R_1$ which is centered at the optical axis, the density is constant with radius and maximum (percent transmittance: about 20–25%) relative to the other regions, whereas in the second region $R_2$ outside of the central region $R_1$, the density decreases linearly with radius. The third region $R_3$ near the rim of the lens has no filtering action.

Consideration will now be given to the operation of the light-modulating device of the construction described above. Suppose that in order to adjust the amount of light passing through the aperture opening to a predetermined value, the aperture setting ring 2 is rotated from the fully open position to the minimum aperture setting position manually or automatically, for example, by a servo motor, thereby the area of the aperture opening defined by diaphragm blades 5 is decreased. So long as the aperture opening defined by the iris diaphragm blades 5 is in such a range that the region $R_3$ is excluded from the aperture opening, but the regions $R_2$ and $R_1$ are included therein, the amount of light passing through the aperture opening is varied in accordance as a function of not only the area of aperture opening but also the integrated density of the neutral density filter over the area, thus the range of light modulation being extended as compared with the aperture control alone. On the other hand, in a range of the aperture opening such that the regions $R_2$ and $R_3$ are excluded but the region $R_1$ is included, the amount of light passing through the aperture opening is dependent upon the aperture opening and the density, but is varied in accordance as a function of only the aperture opening, because the density is constant with radius. The reason why the central region of reasonable area is provided is based on the fact that the accuracy of controlling the amount of light passing through the aperture opening is decreased with decrease in the area of aperture opening and particularly it is very low when the area of aperture opening is so small as to reach the region $R_1$. Therefore, if an alternative region of which the density is linearly decreased with radius from the center point in the same fashion as that in the region $R_2$ is provided instead of the region $R_1$, errors in aperture control would reach as large as a value equivalent to the density difference in the alternative region. According to the invention, in order to reduce such errors to zero, the area of the region $R_1$ is increased to so large value that the error in light modulation at the aperture stop is dependent upon the error due to only the aperture control of the diaphragm blades 5.

As will be seen from the foregoing, the invention contemplates to provide for an extremely extended range of light modulation at the aperture opening of a mechanical diaphragm device in its lens objective. In practice, the user needs only to operate the mechanical diaphragm device along with the objective in the usual manner, thereupon in the case of shading-out operation, the amount of light passing through the aperture opening is decreased with decrease in the area of the aperture opening and simultaneously the transmittance for the light incident upon the filter is decreased with increase in the integrated density of the filter, or the optical attenuator 9, so that the amount of light emerging from the light-modulating device of the invention is decreased as a function of the product of these two control parameters, while in the case of shading-in operation, the amount of light passing through the aperture opening increases with increase in the area of aperture opening, and simultaneously the transmittance at the aperture stop is increased with increase in the amount of light passing through the relatively low density portion of the filter so that the amount of light emerging from the light-modulating device increases as the function of the product of the two control parameters.

Various modification may be made in the characteristics of the optical attenuator as well as in the light-modulating device incorporating the optical attenuator therein within the scope of the invention. Thus, the optical attenuator may be arranged in front of the aperture stop, or two optical attenuators may be employed to be arranged on the both sides of the aperture stop. From the standpoint of restricting the light loss at the fully open aperture position to as small a value as possible, it is preferred that the characteristics and size of the optical attenuator are determined by taking into account the lens aperture and the uniform gradient of light-modulation.

Figure 4:
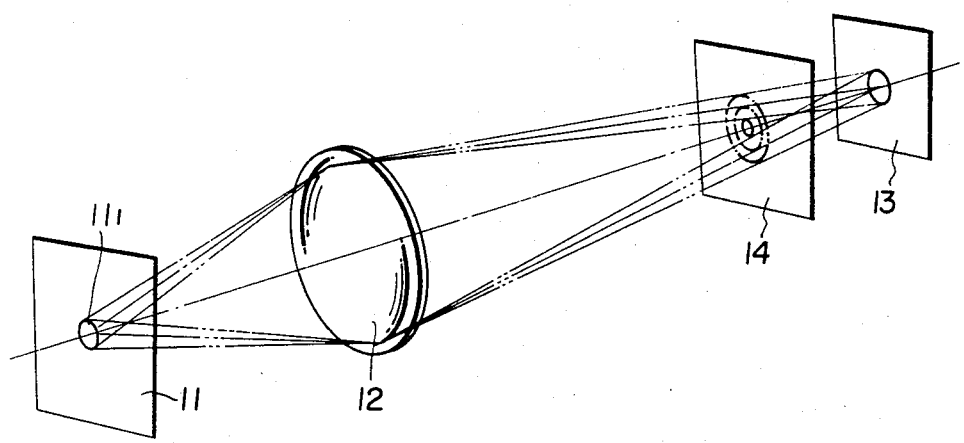
FIG. 4 is a schematic perspective view of an optics for use in producing the filter of FIG. 2.
Figure 5:
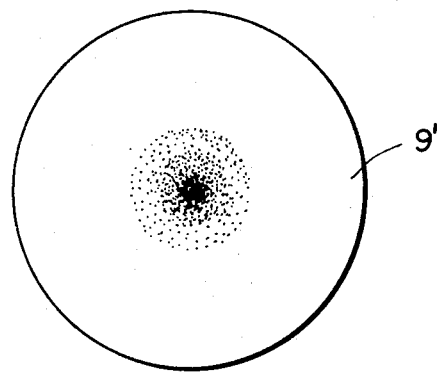
FIG. 5 is a front view of the filter having the same characteristics as those of the filter of FIG. 2 with a modification of using arranged dots.

In FIG. 4, there is shown a diagram of the optical system for making the filter 9 of the device shown in FIG. 1. In this arrangement, an original copy 11 having a circular solid pattern $11_1$ of which the center is on the optical axis and of which the environment is transparent is projected by an imaging lens 12 on a photosensitive silver halide emulsion film positioned just in front of the focal plane 13 from a light source not shown, thereupon the image of the circle pattern on the film 14 is vignetted so that the intensity of incident light upon the film is progressively varied with radius in the region outside of the central region which is centered at the optical axis, while in the central region, the intensity of incident light is almost constant with radius. After a predetermined exposure has been made using a known shutter mechanism not shown, the exposure film is developed and fixed in the known process to produce a negative film from which a desired number of neutral density filters having the characteristics shown in FIG. 3 can be produced by a photographic technique such as the contact printing. As an alternative method of producing a desired number of neutral density filter use may be made of arranged neutral color dots of which the density is radially varied. In this case, any of the printing techniques may be utilized to produce the filter shown in FIG. 5 with ease.

As was previously mentioned, the lens objective with the light-modulating device therein in accordance with the present invention is capable of continuous light-modulation in a very wide range in accordance with only the adjustment of the aperture opening of the mechanical diaphragm, the ratio of the light-modulation reaching several tens of times as large a value as that of the mechanical diaphragm alone, and is of high utility particularly for television cameras provided with image pickup tubes having high sensitive photoelectric converter surfaces, and photographic and cinematographic cameras associated with high sensitive photographic film. Further, with the objective, it is possible to effect proper exposure with high accuracy over a wide range of luminance of subjects to be photographed.

What is claimed is:
1. A light-modulating device comprising:
a mechanical diaphragm for the modulation of light, said modulation being a function of the adjustment of the aperture opening of said diaphragm, said diaphragm having relatively lower aperture accuracy for small aperture openings and relatively higher aperture accuracy for large aperture openings;
drive means for adjusting the aperture opening of the diaphragm; and
a neutral density filter element arranged to optically cover the aperture opening of said diaphragm means, said filter element having at least two regions of different density, one of said regions being a central first region which is centered at the optical axis and in which the density is constant with the radial distance from the optical axis, said first region for cooperation with said mechanical diaphragm for relatively lower aperture accuracy conditions, the other second region being contiguous with said first region, and havings its density vary linearly with the radial distance from the optical axis, said second region for cooperation with said mechanical diaphragm for relatively higher aperture accuracy conditions, whereby light modulation over a wide range is provided which varies as the product of the area of the diaphragm aperture opening and the transmittance of the effective portion of the filter element.

2. A light-modulating device as described in claim 1, wherein said filter element is provided with a further region having transmittances of approximately 100% at its rim contiguous to said second region.

3. A light-modulating device as described in claim 1, wherein said filter element is made from a silver halide emulsion film.

4. A light-modulating device as described in claim 1, wherein the first and second regions of said filter element are formed by arranged minute neutral color dots of which the density is varied with the radius.

* * * * *